United States Patent [19]
Kaji

[11] Patent Number: 4,723,169
[45] Date of Patent: Feb. 2, 1988

[54] IMAGE PICKUP APPARATUS HAVING COORDINATED CLAMPING AND ANTI-BLOOMING MEANS

[75] Inventor: Toshio Kaji, Yokohama, Japan

[73] Assignee: Canon Kabushiki Kaisha, Tokyo, Japan

[21] Appl. No.: 57,671

[22] Filed: Jun. 2, 1987

Related U.S. Application Data

[63] Continuation of Ser. No. 793,548, Oct. 31, 1985, abandoned.

[30] Foreign Application Priority Data

Nov. 7, 1984 [JP] Japan ................. 59-234344

[51] Int. Cl.⁴ ............................................. H04N 3/14
[52] U.S. Cl. ....................... 358/213.31; 358/213.18; 358/213.26; 358/172
[58] Field of Search ............... 358/171, 172, 163, 221, 358/209, 213.18, 213.16, 213.26, 213.31

[56] References Cited

U.S. PATENT DOCUMENTS

| | | | |
|---|---|---|---|
| 4,038,690 | 7/1987 | Hoagland | 358/213 |
| 4,551,761 | 11/1985 | Sase et al. | 358/213 |
| 4,562,475 | 12/1985 | Levine | 358/171 |

FOREIGN PATENT DOCUMENTS 50220  4/1979  Japan.

Primary Examiner—Thomas W. Brown
Assistant Examiner—Stephen Brinich
Attorney, Agent, or Firm—Fitzpatrick, Cella, Harper & Scinto

[57] ABSTRACT

An image pickup apparatus capable of removing unnecessary charge in the image pickup area during charge storage, which apparatus can perform a clamp processing of a video signal without being affected by such a removal operation of the unnecessary charge.

35 Claims, 20 Drawing Figures

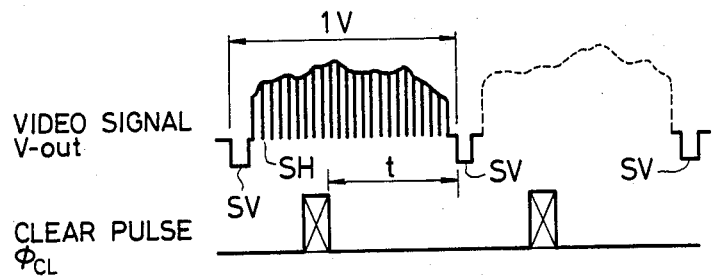
FIG. 1A VIDEO SIGNAL V-out
FIG. 1B CLEAR PULSE $\phi_{CL}$
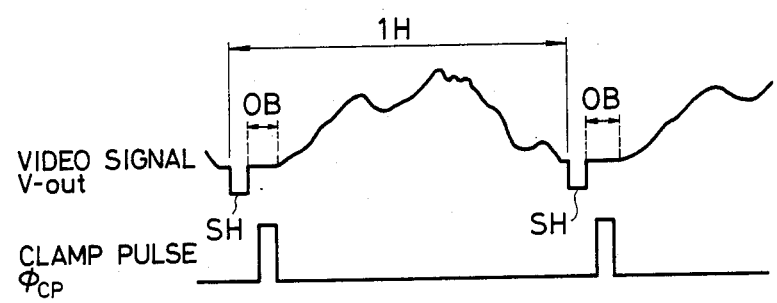
FIG. 2A VIDEO SIGNAL V-out
FIG. 2B CLAMP PULSE $\phi_{CP}$
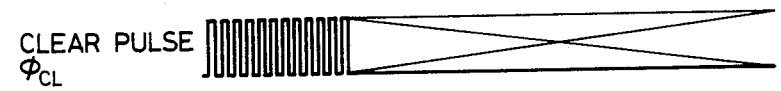
FIG. 2C CLEAR PULSE $\phi_{CL}$
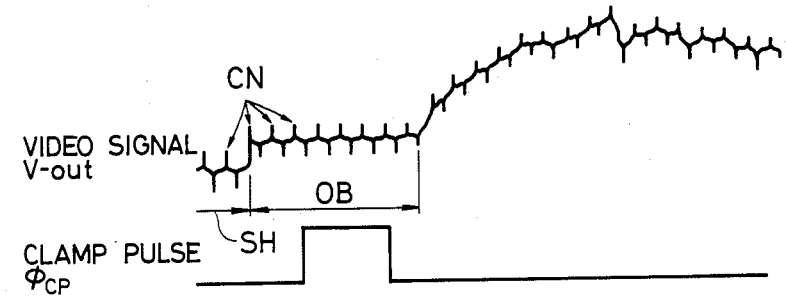
FIG. 3A VIDEO SIGNAL V-out
FIG. 3B CLAMP PULSE $\phi_{CP}$

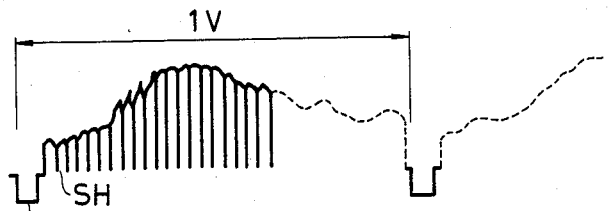
FIG. 5A VIDEO SIGNAL V-out
FIG. 5B 74 OUTPUT
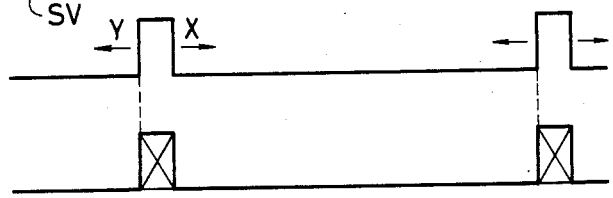
FIG. 5C 76 OUTPUT CLEAR PULSE $\phi_{CL}$
FIG. 5D 9 OUTPUT
FIG. 5E 8 OUTPUT CLAMP PULSE $\phi_{CP}$
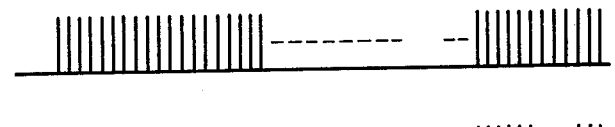
FIG. 5F 10 OUTPUT
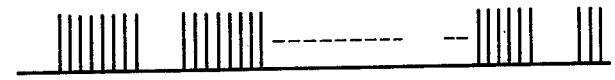

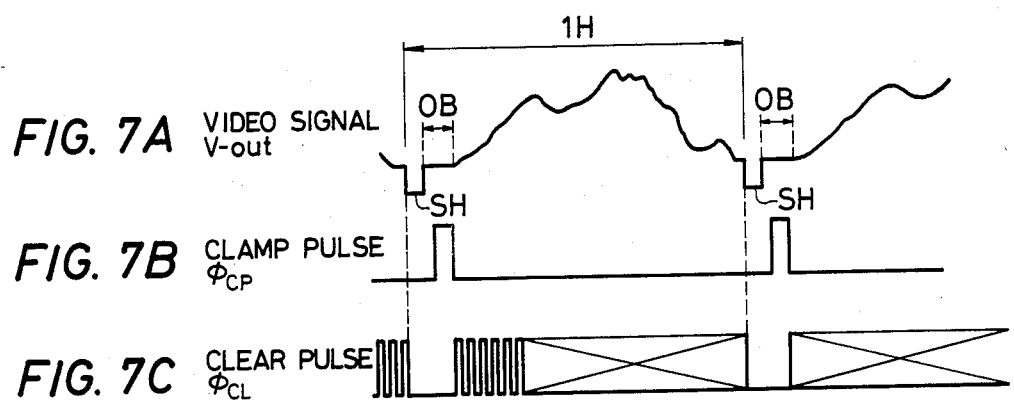
FIG. 7A VIDEO SIGNAL V-out
FIG. 7B CLAMP PULSE $\phi_{CP}$
FIG. 7C CLEAR PULSE $\phi_{CL}$
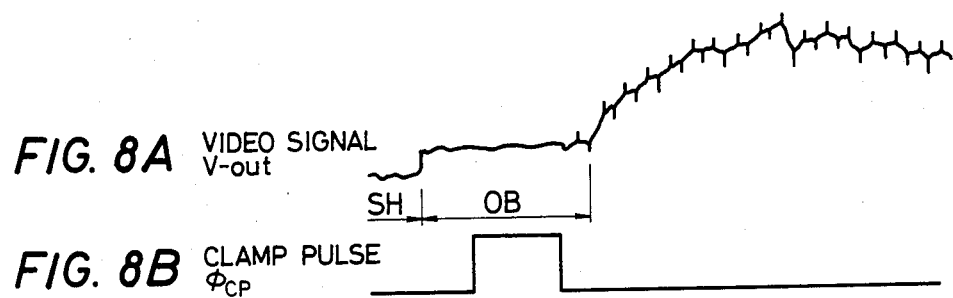
FIG. 8A VIDEO SIGNAL V-out
FIG. 8B CLAMP PULSE $\phi_{CP}$

IMAGE PICKUP APPARATUS HAVING COORDINATED CLAMPING AND ANTI-BLOOMING MEANS

This application is a continuation of application Ser. No. 793,548 filed Oct. 31, 1985, now abandoned.

BACKGROUND OF THE INVENTION

1. Field of the Invention

The present invention relates to an image pickup apparatus and more particularly to an image pickup apparatus using solid-state image sensors.

2. Description of the Prior Art

It is necessary to drive solid-state image sensors (e.g., CCD) in synchro with the television field period if they are used for television image sensing. For example, a television system in conformity with the NTSC system has its field period of 1/60 sec. Therefore, where frame transfer type image sensors are used, it is necessary to transfer signals (charge) from the image pickup or sensing area to the image storage area at the period of 1/60 sec and drive the image storage area during about 1/60 sec in order to read the image storage signal (charge) from the image storage area.

Apart from the above, it is also necessary to suppress the outputs of the sensors and the image signals obtained by processing the sensor outputs within a certain stable range regardless of a wide brightness variation of the object to be sensed. In this respect, the quantity of incident light to the image pickup area has been adjusted heretofore by using such as a stop, or the image signal level has been adjusted heretofore by inserting an AGC amplifier in the output processing system.

However, in case the object to be sensed has an extremely high brightness, adjustment of the signal level often becomes unsatisfactory if such a stop or an AGC amplifier only is used.

Furthermore, if an object to be sensed moves at a high speed, undesirable so-called image-running or image-fluctuation may occur while displaying on a display electrical signals obtained from the image pickup area. This results from the fact that the light reception time at the image pickup area, under drive in conformity with the television field period, is about 1/60 sec.

The above problems arise from the fact that the image sensors are driven in accordance with the television field period. In order to solve this, it is known to control the light reception time by using a mechanical shutter. Use of a mechanical shutter again leads to the problems that the image pickup apparatus becomes bulky, the construction and control system become complicated, and the cost for the apparatus becomes expensive.

In order to solve such problems, it is known in the art to provide an unnecessary charge removal function for removal of unnecessary charge from the image pickup area. Of the known drive methods for a frame transfer type solid-state image sensor provided with an unnecessary charge removal area, one method realizing such unnecessary charge removal function has been proposed, wherein at a certain time instant during the charge storage period at the image sensing area, the image sensor is driven so as to remove the storage charge stored upto such time instant in the image pickup area via the unnecessary charge removal area; and whereby a mechanical means such as a shutter is not needed and a shorter charge storage time than the field period can be obtained.

For example, a method using such unnecessary charge removal function is disclosed in the Official Gazette of Japanese Patent Publication No. 27712/1983 corresponding to U.S. Pat. No. 4,245,164 issued on Jan. 13, 1981. According to the method, an elimination electrode or overflow drain (hereinafter called top drain) is provided on the opposite side of the image pickup area relative to the image storage area of a known frame transfer type solid-state image sensor. The storage charge in the image pickup area at a certain time instant during the charge storage period is transferred in the opposite direction (i.e., the direction opposite to that of readout) toward the top drain and collected at the top drain where the image storage charge is eliminated.

The assignee of Japanese Patent Application No. 61098/1983 corresponding to U.S. Ser. No. 596,404 filed on Apr. 3, 1984 has proposed and disclosed therein a method realizing unnecessary charge removal function. In particular, in the method of driving a known frame transfer type solid-state image sensor provided with a blooming preventive overflow drain serving as an excessive charge removal area in the image pickup area at a certain time instant during the charge storage period at the image pickup area, the image pickup area is driven independently from the image storage area so that the storage charges in the image pickup area are collected at the boundary between the image pickup and storage areas to remove them via the overflow drain positioned at the boundary.

Alternatively, as disclosed in the Official Gazette of Japanese Unexamined Publication No. 18064/1980 corresponding to U.S. Pat. No. 4,328,432 issued on Jan. 14, 1981, there is known a construction of a frame transfer type or interline type image sensor, wherein a blooming preventive area for removing excessive charge by means of the charge recombination method is provided in the image pickup area. With such construction, it is possible to remove excessive charge by driving the blooming preventive area at a proper timing during the charge storage period at the image pickup area.

Still further, it is well known that an image pickup apparatus using a solid-state image sensor, similar a conventional image tube, requires a clamping circuit provided in the image signal processing system. The clamping circuit is provided for maintaining the DC level of an image signal at a constant level, for example, for maintaining the DC level of each horizontal scan signal at a certain black level. To this end, a light shield portion (hereinafter referred to as optical black) is provided in the image pickup area of the image sensor at a position corresponding to the head portion of each horizontal scan signal. Thus, it is arranged to clamp the signal level obtained by the optical black to a constant level (reference black level or optical black level).

As described in the foregoing, when an opposite directional and vertical transfer pulse (in case of the Official Gazette of Japanese Patent Publication No. 27712/1983) or a normal directional and vertical transfer pulse (in case of the Official Gazette of Japanese Patent Application No. 61098/1983) is applied to the image pickup area for removal of the unnecessary charge during charge storage at the image pickup area, or a drive pulse (in case of the Official Gazette of Japanese Unexamined Patent Publication No. 18064/1980) is applied to the recombination blooming preventive area in the image pickup area for removal of the excessive charge. At those time instants, reading signal charge from the storage area and its processing are being performed (the above pulses are generally called charge clear pulse hereinafter where applicable). As a result, as the charge clear pulse is applied, the signal charge is superposed with the charge clear pulse as a noise. Particularly while a clamping operation is being performed by reading the signal charge from the optical black, there arises a problem that the DC level of an image signal charge other than that from the optical black changes to a large degree because of the superposed noises. Such a problem will be described in a concrete way with reference to the accompanying drawings.

FIG. 1 shows a relationship between the above-noted charge clear pulse and a one field (1V) image signal obtained by reading signals from a solid-state image sensor. The image signal V-out shown in FIG. 1A is obtained by reading signals from the sensor, during such reading period the charge for the next image signal being accumulated as well known in the art in the image pickup area. By applying a charge clear pulse $\phi$ cl shown in FIG. 1B to the image pickup area at a certain timing while reading signals from the sensor or while accumulating charge in the image pickup area, substantially all of the previously stored charge is cleared in case of the drive method disclosed in the above-described Official Gazette of Japanese Patent Publication No. 27712/1983 or Japanese Patent Application No. 61098/1983. The effective charge storage period becomes t which is shorter than 1V period. In case of the construction as disclosed in the Official Gazette of Japanese Patent Unexamined Publication No. 18064/1980, excessive charge is to be removed. In the figure, references Sv and Sh denote the periods during which vertical and horizontal pulses are applied, respectively.

FIG. 2 shows a relationship between a one horizontal line (1H) image signal, clamp pulse for the clamping circuit, and charge clear pulse. As shown in FIG. 2A, the reference black level (optical black level) OB is obtained during a predetermined time period immediately after each horizontal synchro period Sh in the image signal V-out, by virtue of the construction of the image pickup area of the image sensor which will be described later. Also as will be described later, the clamping circuit in the image signal processing system is arranged to clamp the reference black level upon reception of a clamp pulse $\phi$ cp. FIG. 2C shows the above-described charge clear pulse $\phi$ cl and is applied over several Hs as understood from FIGS. 1A and 1B.

As shown in FIG. 3A which shows a portion of FIG. 2A magnified in time scale, noises CN are interposed on the image signal V-out due to the charge clear pulses $\phi$ cl. Therefore, as a black level clamping is performed during the period of a clamp pulse $\phi$ cp shown in FIG. 3C, the clamp level shifts due to such noises CN so that a correct DC restoration of an image signal becomes impossible.

In order to eliminate such disadvantage, the assignee of U.S. Ser. No. 602,731 filed on Apr. 23, 1984, now abandoned, has proposed a technique to stop application of the charge transfer pulses $\phi$ cl to the image sensor during the period the clamp pulse $\phi$ cp is being outputted.

However, in case the energy of the charge transfer pulse $\phi$ cl is relatively large, even if the application of the charge transfer pulses $\phi$ cl is stopped at the time when a clamp pulse $\phi$ cp is outputted, there is a possibility for such stoppage to adversely affect the image signal so that a sufficient effect cannot be expected.

SUMMARY OF THE INVENTION

In view of the above problems, it is a first object of the present invention to perform a clamp operation for an image signal without being affected by the charge removal operation of a charge removal means of an image pickup apparatus which is constructed such that charge is removed by the charge removal means during the charge storage period of the solid-state image sensor. It is a second object of the present invention to perform as above and obtain a stable clamp operation by selecting suitable timings between the charge removal operation and clamp operation so as not to influence the charge removal operation upon the clamp operation.

According to the preferred embodiments of the present invention taking into consideration the above objects, one aspect is to inhibit a clamp operation while a charge removal operation is carried out.

According to the preferred embodiments of the present invention taking into consideration the above objects, another aspect is to inhibit a charge removal operation during the time from a predetermined time before the clamp operation of an image signal to the time during which a clamp operation is performed.

Other objects of the present invention will become apparent from the following description of the embodiments.

BRIEF DESCRIPTION OF THE INVENTION

FIGS., 1A and 1B show a relationship between a one field image signal and charge clear pulse;

FIGS. 2A to 2C show a relationship between a one horizontal line image signal, clamp pulse and charge clear pulse;

FIGS. 3A and 3B are enlarged views showing the image signal and, clamp pulse of FIGS. 2A and 2B;

FIGS. 5A to 5F show the outputs from the main part of the circuit for explaining the operation of the first embodiment of FIG. 4;

FIGS. 7A to 7C show the outputs from the main part of the circuit for explaining the operation of the second embodiment of FIG. 6; and FIGS. 8A and 8B are enlarged views of the image signal and clamp pulse of FIG. 7.

DETAILED DESCRIPTION OF THE PREFERRED EMBODIMENTS

According to the preferred embodiments described hereinafter, during charge clearing a clamp operation is inhibited by stopping a supply of a clamp pulse $\phi$ cp to the clamping circuit during the time a charge clear pulse $\phi$ cl is supplied to an image sensor, thereby avoiding occurrence of an undesired state that an image signal is clamped at an incorrect level.

Figure 4:
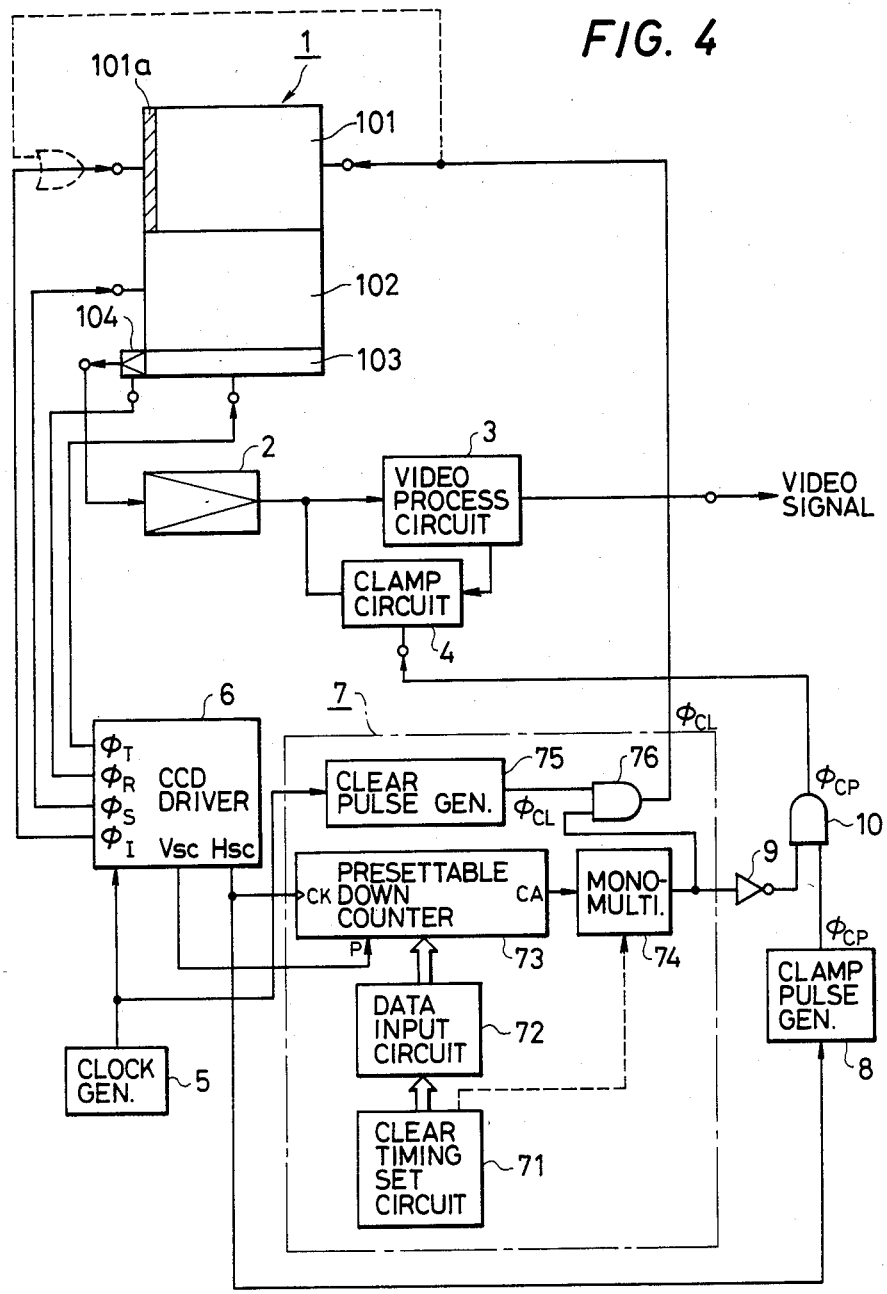
FIG. 4 is a block diagram showing a construction of an electrical circuit according to a first embodiment of the present invention.

FIG. 4 shows a circuit construction according to an embodiment of the present invention. Reference numeral 1 denotes a solid-state image sensor of a frame transfer type CCD though not limited thereto. In CCD, reference numeral 101 denotes an image sensing or pickup area for producing electrical signals or charge in response to incident light and for accumulating the charge. Reference numeral 102 represents an image or charge storage area for fetching the accumulated charge and temporarily storing it. Reference numeral 103 denotes a horizontal register area for sequentially reading one line charge stored in the charge storage area. Reference numeral 104 denotes an output amplifier area provided on the output side of the horizontal register area 103 for converting the charge into a voltage.

As is well known, the image pickup area 101 has a two-dimensional arrangement of image pickup cells aligned in a predetermined number of columns and rows. The image storage area 102 has also a two-dimensional arrangement of image pickup cells aligned in the same number of columns and rows. The horizontal register area 103 has a one-dimensional arrangement of charge transfer cells the same in number as that of the image storage cell column and aligned in a row. A portion 101a of the image pickup area 101 is shielded from light in the vertical direction to obtain a reference black level (optical black level OB).

For use with a frame transfer type CCD television, as is well known in the art, vertical transfer pulses are required for vertical transfer of the charge generated and accumulated at the image pickup area 101 to the image storage area 102, the vertical transfer pulses being supplied at the timing of a period corresponding to and synchronizing with the field period of the television. Further, at least step transfer pulses, horizontal transfer pulses and reset pulses are required. The step transfer pulses are supplied to the image storage area 102 and horizontal register area 103 at the timing of a period corresponding to and substantially synchronizing with the horizontal line period of the television, so that the charges stored in the image storage area 102 are transferred to the horizontal register area, one line after another. The horizontal transfer pulses are supplied to the horizontal register area 103, so that the charge in the horizontal register area 103 is horizontally transferred during a one line period to the output amplifier area 104. The reset pulses are supplied to the output area 104, so that the charge is reset each time the charge-voltage conversion of each pixel information is performed. Furthermore, in the present embodiments, the above-noted charge clear pulses $\phi$ cl, i.e., pulses for removing charge by controlling the state of a potential well in the image pickup area, are supplied to the image pickup area 101. Such clear pulses $\phi$ cl may be used for the charge removal methods of the above-noted Official Gazettes of Japanese Patent Publication No. 27712/1983, Japanese Patent Unexamined Publication No. 61098/1983, and Japanese Patent Unexamined Publication No. 180649/1980, as well as other charge removal methods.

Reference numeral 2 denotes an amplifier circuit for amplifying image signals outputted from CCD 1. Reference numeral 3 denotes a known video processing circuit, reference numeral 4 denotes a known clamping circuit provided in association with the video processing circuit 3 for clamping each horizontal line signal of the video signal to the reference black level upon reception and in response to a clamp pulse $\phi$ cp.

Reference numeral 5 denotes a clock generator for generating reference clock signals, reference numeral 6 denotes a CCD driver for outputting various drive signals for CCD 1, vertical synchro signals Vsc and horizontal synchro signals Hsc, based upon the clock signals from the clock generator 5. The various drive signals outputted to CCD 1 are: vertical transfer pulses $\phi$ 1 for the image pickup area 101; vertical transfer and step transfer pulses $\phi$ s for the image storage area 102; step transfer and horizontal transfer pulses $\phi$ T for the horizontal register area 103; and reset pulses $\phi$ R for the output amplifier area 104.

Reference numeral 7 denotes a clear pulse supply circuit which includes: a clear timing set circuit 71 for setting a charge clear timing; a data input circuit 72 for converting the output from the timing set circuit 71 into a counter preset data; a presettable down counter 73 wherein the output data from the data input circuit 72 is preset by the vertical synchro signal Vsc and which counts down in response to the horizontal synchro signal Hsc; a monostable multivibrator 74 (one-shot circuit) for outputting a single pulse of a determined width in response to a carry output from the counter 73; a clear pulse generating circuit 75 for generating a charge clear pulse $\phi$ cl in response to a clock signal from the clock generator 5; and an AND gate 76 for passing the clear pulse $\phi$ cl from the clear pulse generator circuit 75 during the time the output of the monostable multivibrator 71 is high. The clear pulse $\phi$ cl outputted from the AND gate 76 is supplied to the image pickup area 101 of CCD 1.

Reference numeral 8 denotes a clamp pulse generator which generates the clamp pulse $\phi$ cp in response to the horizontal synchro signal Hsc. Reference numeral 9 denotes an inverter for inverting the output of the monostable multivibrator 74 of the clear pulse supply circuit 7. Reference numeral 10 represents an AND gate for passing the clamp pulse $\phi$ cp from the clamp pulse generator 8, only during the time the output of the inverter 9 is high, and hence only during the time the output of the monostable multivibrator 74 is low and a clear pulse $\phi$ cl is not supplied to CCD 1. The clamp pulse $\phi$ cp outputted to the AND gate 10 is supplied to the clamp circuit 4.

In the circuit construction as above, CCD 1 outputs an image signal by being driven by the CCD driver 6. The image signal is amplified by the amplifier 2 and thereafter processed by the video processing circuit 3 to output a video signal. In addition, by the processing at the processing circuit 3, the video signal is clamped at a black level by the clamp circuit 4.

Here, a desired clear timing within a 1V period of the video signal V-out has been set at the clear timing set circuit 71 of the clear pulse supply circuit 7. Then, a preset data in accordance with the clear timing set at the timing set circuit 71 is outputted from the data input circuit 72. The preset data is preset in the presettable down counter 73 at the timing of the vertical synchro signal Vsc. Thereafter, the counter 73 counts down in response to the horizontal synchro signal Hsc to output a carry signal when the content thereof becomes "0". In response to this, the monostable multivibrator 74 outputs a single pulse of a predetermined width as shown in FIG. 5B. During such period, the clear pulse generator circuit 75 has been outputting clear pulses $\phi$ cl based upon the clock signals from the clock generator 5. Therefore, when the output of the monostable multivibrator 74 becomes high, a clear pulse $\phi$ cl as shown in FIG. 5c is outputted from the AND gate 76 to the image pickup area 101 of CCD 1. Consequently, the unnecessary or excessive charge in the image pickup area 101 is removed as discussed in the foregoing.

Now, as shown in FIG. 5E, the clamp pulse generator circuit 8 is outputting clamp pulses $\phi$ cp based upon the horizontal synchro signal Hsc, and these clamp pulses are to be supplied via one input of the AND gate 10 to the clamping circuit 4. In this case, since the output (FIG. 5D) of the inverter 9 which inverted the output (FIG. 5B) from the monostable multivibrator 74 in the clear pulse supply circuit 7 is supplied to the other input of the AND gate 10, the AND gate 10 outputs the clamp pulses $\phi$ cp shown in FIG. 5F lacking those clamp pulses corresponding to the supply period of the clear pulse $\phi$ cl to the image pickup area 101 of CCD 1. Consequently, clamping of an incorrect black level due to the pulse noise of the clear pulse $\phi$ cl as discussed with FIG. 3 is prevented. It is noted that the clamping circuit 4 in this embodiment has a large time constant so as to ensure a sufficient clamping operation during the time the clamp pulses $\phi$ cp are lacked.

Instead of using the AND gate 10, the inhibition of clamp pulses $\phi$ cp may be achieved by inhibiting the horizontal synchro signal Hsc inputted to the clamp pulse generator circuit 8 by the output of the inverter 9, or by directly controlling the clamp pulse generator circuit 8 to enable or disable it.

It is effective to make the setting of the supply timing of the clear pulse $\phi$ cl by the clear timing set circuit 71 vary as desired as shown by arrows X and Y in FIG. 5B. Furthermore, the pulse width, i.e., clear period, may be so arranged to vary as desired by adjusting for example the time constant of the monostable multivibrator 74 as shown by a broken line in FIG. 4.

The clear timing set circuit 71 may be of a construction by which clear timings and the like can be set manually, or a construction by which clear timings and the like can be set automatically in accordance with such as measured light information. In this case, if the brightness is high, the clear timing is shifted to the right as shown by arrow X in FIG. 5B or the clear period is enlarged. Alternatively, if the brightness is low, the clear timing is shifted to the left as shown by arrow Y in FIG. 5B or the clear period is shortened.

In the above embodiment, the clamp pulses $\phi$ cp have been inhibited during the supply period of a clear pulse $\phi$ cl. However, in contrast with the above embodiment, the clear pulses $\phi$ cl may be made not to be applied, during the time from a predetermined time before the clamp pulse $\phi$ cp is outputted to a time when the clamp pulse $\phi$ cp falls. Such an embodiment will be described with reference to FIG. 6.

Figure 6:
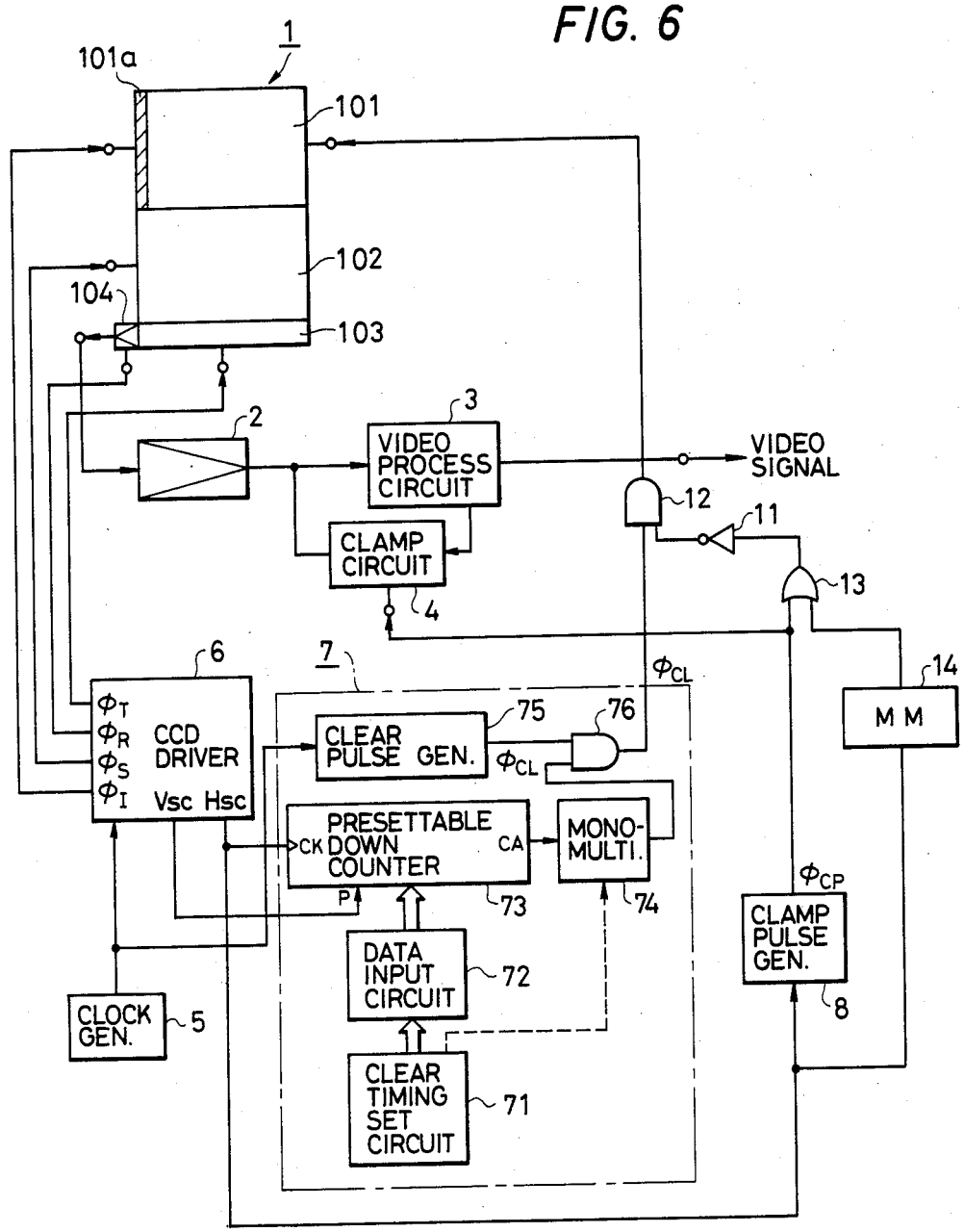
FIG. 6 is a block diagram showing a construction of an electrical circuit according to a second embodiment of the present invention.

In FIG. 6, the elements having the same function as those in the embodiment of FIG. 4 have been designated by identical references and the description therefor is omitted. Referring to FIG. 6, the circuit comprises an inverter 11, AND gate 12, OR gate 13 and a monostable multivibrator 14 which maintains an output of H level at least until the time when a clamp pulse $\phi$ cp is outputted upon reception of a pulse Hsc representative of the H blanking period. The provision of this circuit ensures the inhibition of a supply of clear pulses $\phi$ cl to the image pickup area 101, during the time from the start of the H blanking period before the rise of the clamp pulse $\phi$ cp to an H level to the time while the clamp pulse $\phi$ cp maintains H level. The operation of this embodiment will be described with reference to FIGS. 7 and 8. FIG. 7 corresponds to the waveforms of FIG. 2 and shows a relationship between a one horizontal line (1H) video signal, clamp pulses and charge clear pulse, respectively of the present embodiment. FIG. 8 corresponding to the waveforms of FIG. 3 is an enlarged view of the main portion of FIG. 7.

As shown in FIGS. 7 and 8 of this embodiment, clear pulses $\phi$ cl are not outputted during the time from the H blanking period SH to the time when the clamp pulse $\phi$ cp falls from its H level to L level. Thus, it is possible to prevent superposition of noises CN from the clear pulses $\phi$ cl onto the optical black level indicated with respect to OB, and accordingly perform a stable clamp operation.

In the above embodiment of the invention, the clear pulses $\phi$ cl have been applied to an electrode of exclusive use in removing unnecessary charge in the image pickup area 101 of CCD 1. However, in case of the method of Japanese Patent Application No. 61098/1983 assigned to the present applicant, an alternative method may be employed. That is, as shown by another broken line of FIG. 4, an OR gate is provided which is supplied with both clear pulse $\phi$ cl and vertical transfer pulse $\phi$ I. Instead of the vertical transfer pulse $\phi$ I, the output of the OR gate is inputted to the image pickup area 101. Therefore, the clear pulse $\phi$ cl may be inputted to the same electrode to which the vertical transfer pulse $\phi$ I is inputted.

Furthermore, in case that the clear pulse $\phi$ cl is used as a vertical transfer pulse for removing unnecessary charge in the image pickup area 101 as in the method of Japanese Patent Application No. 61098/1983 by the present applicant, it is necessary to make the pulse energy substantially large. Therefore, with such substantially large energy, even if a supply of the clear pulses $\phi$ cl to the image pickup area 101 is intended to be inhibited for the predetermined period before the generation of a clamp pulse $\phi$ cp and for the period while the clamp pulse $\phi$ cp is generated, there is an occasion that the readout signal level from the image storage area 102 during the generation of the clamp pulse may fluctuate due to the influence by the clear pulses $\phi$ cl just before the generation of the clamp pulse $\phi$ cp. Therefore, there is a possibility that a stable clamp operation may not be achieved. However, in the embodiment shown in FIG. 4, the generation of a clamp pulse $\phi$ cp is prevented during the time while the clear pulses $\phi$ cl are generated, thereby resulting in a more reliable effect. In case that the energy of the clear pulses $\phi$ cl is small and that the fluctuation of the video signal read out from the image storage area 102 stops after a certain time lapse after stoppage of the supply of the clear pulses $\phi$ cl, the embodiment of FIG. 6 ensures a stable clamp operation.

If the charge removal method shown in Japanese Patent Unexamined Publication No. 61098/1983 is used for removal of part of the signal charge, in order not to superpose noises on the image signal, it is preferable to apply such clear pulses cl during the time near the horizontal blanking period not related to the period of readout of an image signal. In the embodiment shown with FIGS. 6 to 8, the clear pulses $\phi$ cl have been inhibited during the time from the horizontal blanking period SH to the time when the clamp pulse $\phi$ cp falls. However, such operation need not be necessary for all of the horizontal blanking periods of one frame or 525 horizontal line periods. For example, such operation may be effected for half of the horizontal periods or 200 horizontal line periods and the clear pulses $\phi$ cl may be generated for the remaining 200 horizontal blanking line periods. Furthermore, the number of such operations may be varied with the video signal level.

As seen from the foregoing detailed description of the present invention, the image pickup apparatus using a solid-state image sensor and removing the charge in the image pickup area during charge storage by means of charge removal means, can perform a clamp processing of a video signal without being affected by the operation of the charge removal means, which is very useful for the apparatus of this type.

I claim:

1. An image pickup device comprising:
   (a) image pickup means for converting an image into an electrical signal;
   (b) removal means for removing at least part of said electrical signal;
   (c) clamp means for clamping said electrical signal at a predetermined timing; and
   (d) inhibition means for inhibiting a predetermined timing clamp operation of said clamp means during the operation of said removal means.

2. An image pickup device of claim 1, wherein said clamp means performs a clamp operation in response to a clamp pulse, and said inhibition means is means for inhibiting generation of said clamp pulse during the operation of said removal means.

3. An image pickup device comprising:
   (a) image pickup means for converting an image into an electrical signal;
   (b) removal means for removing at least part of said electrical signal;
   (c) clamp means for clamping said electrical signal; and
   (d) inhibition means for inhibiting the operation of said removal means from a predetermined time before said clamp means performs a clamp operation.

4. An image pickup device of claim 3, wherein said predetermined time is a time from when the operation of said removal means is inhibited to when the operation of said removal means does not exert at least substantial adverse influence upon said electrical signal.

5. An image pickup device comprising:
   (a) image pickup means for accumulating an image signal during a predetermined accumulation period;
   (b) readout means for reading out said image signal accumulated by said image pickup means, after the lapse of said accumulation period;
   (c) clamp means for clamping the image signal read out by said readout means;
   (d) removal means for removing said image signal during said accumulation period; and
   (e) inhibition means for inhibiting a clamp operation of said clamp means during the operation of said removal means.

6. An image pickup device of claim 5, wherein said clamp means performs a clamp operation in response to a clamp pulse, and said inhibition means is means for inhibiting generation of said clamp pulse during the operation of said removal means.

7. An image pickup device of claim 5, wherein said removal means is means for driving said readout means during said accumulation period.

8. An image pickup device comprising:
   (a) image pickup means having a function to accumulate an image signal during a predetermined accumulation period;
   (b) storage means for storing an image signal accumulated in said image pickup means and transferred after a lapse of said accumulation period;
   (c) readout means for sequentially reading out said image signal stored in said storage means, said sequential readout taking the same time as said accumulation period;
   (d) signal processing means for performing a clamp operation of the image signal read out by said readout means for every period shorter than said accumulation period and processing said image signal based on the results of said clamp operation;
   (e) removal means for removing said image signal accumulated in said image pickup means during said accumulation period; and
   (f) inhibition means for inhibiting the clamp operation of said clamp means during the operation of said removal means.

9. An image pickup device of claim 8, wherein the clamp operation of said signal processing means is performed in response to a clamp pulse, and said inhibition means is means for inhibiting generation of said clamp pulse during the operation of said removal means.

10. An image pickup device of claim 8, wherein said image pickup means is image pickup cells arranged in a two-dimensional configuration, and said clamp means performs a clamp operation every time said readout means reads out a one line image signal from said image pickup cells.

11. An image pickup device of claim 8, wherein said image pickup means has a potential well and accumulates said signal in said potential well.

12. An image pickup device of claim 11, wherein said removal means removes said image signal by controlling the depth of said potential well.

13. An image pickup device of claim 12, wherein said image pickup means has a charge removal area, and said removal means transfers said image signal to said charge removal area by controlling said potential well.

14. An image pickup device comprising:
   (a) image pickup means for accumulating an image signal for a predetermined accumulation period;
   (b) readout means for reading out said image signal accumulated by said image pickup means, after the lapse of said accumulation period;
   (c) clamp means for clamping the image signal read out by said readout means;
   (d) removal means for removing said image signal during said accumulation period by utilizing a read out operation of said readout means; and
   (e) inhibition means for inhibiting the operation of said removal means from a predetermined time before the time when said clamp means performs a clamp operation.

15. An image pickup device of claim 14, wherein said predetermined time is a time from when the operation of said removal means is inhibited to when the operation of said removal means does not give at least substantial adverse influence upon said electrical signal.

16. An image pickup device comprising:
   (a) image pickup means having a function to accumulate an image signal during a predetermined accumulation period;
   (b) storage means for storing an image signal accumulated in said image pickup means and transferred after a lapse of said accumulation period;
   (c) readout means for sequentially reading out said image signal stored in said storage means, said sequential readout taking the same time as said accumulation period;
   (d) signal processing means for performing a clamp operation of the image signal read out by said readout means for every period shorter than said accumulation period and processing said image signal based on the results of said clamp operation;

(e) removal means for removing said image signal accumulated in said image pickup means during said accumulation period by utilizing a readout operation of said readout means; and (f) inhibition means for inhibiting the operation of said removal means from a predetermined time before the time when said clamp means performs a clamp operation.

17. An image pickup device of claim 16, wherein said predetermined time is a time when the operation of said removal means is inhibited to when the operation of said removal means does not give at least substantial adverse influence upon said electrical signal.

18. An image pickup device of claim 16, wherein said image pickup means comprises image pickup cells arranged in a two-dimensional configuration, and said clamp means performs a clamp operation every time said readout means reads out a one line image signal from said image pickup cells.

19. An image pickup device of claim 16, wherein said image pickup means has a potential well and accumulates said signal in said potential well.

20. An image pickup device of claim 16, wherein said removal means removes said image signal by controlling the depth of said potential well.

21. An image pickup device of claim 16, wherein said image pickup means has a charge removal area, and said removal means transfers said image signal to said charge removal area by controlling said potential well.

22. An image pickup device comprising:

(a) image pickup means having a function to accumulate an image signal during a predetermined accumulation period;

(b) storage means for storing an image signal accumulated in said image pickup means and transferred after a lapse of said accumulation period;

(c) readout means for sequentially reading out said image signal stored in said storage means, said sequential readout taking the same time as said accumulation period;

(d) signal processing means for performing a clamp operation of the image signal read out by said readout means for every period shorter than said accumulation period and processing said image signal based on the results of said clamp operation;

(e) removal means for removing said image signal accumulated in said image pickup means during said accumulation period; and (f) control means for disabling the clamp operation of said clamp means during the operation of said removal means and processing the image signal based on the result of the previous clamp operation.

23. An image pickup device of claim 22, wherein said image pickup means is image pickup cells arranged in a two-dimensional configuration, and said clamp means performs a clamp operation every time said readout means reads out a one line image signal from said image pickup cells.

24. An image pickup device of claim 22, wherein said image pickup means has a potential well and accumulates said signal in said potential well.

25. An image pickup device of claim 22, wherein said removal means removes said image signal by controlling the depth of said potential well.

26. An image pickup device of claim 22, wherein said image pickup means has a charge removal area, and said removal means transfers said image signal to said charge removal area by controlling said potential well.

27. A device comprising:

(a) electrical signal generator means for generating an electrical signal in a time sequence;

(b) clamp means for clamping said electrical signal generated by said electrical signal generator means at a predetermined timing;

(c) means for producing a level change of said electrical signal generated by said electrical signal generator means; and (d) inhibition means for inhibiting the clamp operation of said clamp means by said means producing a level change of said electrical signal even at said predetermined timing, if a level change of said signal is present.

28. A device of claim 27, wherein said electrical signal generator means includes:

(a) image pickup means for converting an image into an electrical signal; and (b) readout means for time-serially reading out said electrical signal.

29. A device of claim 28, wherein said image pickup means is constructed of a plurality of image pickup cells, and said readout means time-serially reads out signals from said image pickup cells.

30. A device of claim 29, wherein said clamp means clamps said signal every time a predetermined number of said image pickup cells are read out.

31. A device of claim 27, wherein said means producing a level change of said electrical signal is a drive signal for performing a particular operation of said electrical signal generator means.

32. A device of claim 31, wherein said drive signal is a signal for removing said electrical signal.

33. A device of claim 32, wherein said electrical signal generator means includes:

(a) image pickup means for converting an image into an electrical signal; and (b) readout means for time-serially reading out said electrical signal.

34. A device of claim 32, wherein said image pickup means comprises a plurality of image pickup cells, and said readout means time-serially reads out signals from said image pickup cells.

35. A device of claim 34, wherein said clamp means clamps said signal every time a predetermined number of said image pickup cells are read out.

* * * * *